US008229626B2

(12) United States Patent  (10) Patent No.: US 8,229,626 B2
Medler et al.  (45) Date of Patent: Jul. 24, 2012

(54) MULTI-FUNCTION CONTROL DEVICE AND RADIO-NAVIGATION SYSTEM FOR A MOTOR VEHICLE

(75) Inventors: Andreas Medler, Lengede (DE); Jan Michaelis, Berlin (DE); Frank Hauschild, Berlin (DE); Kyoung Sun Han, Berlin (DE)

(73) Assignee: Volkswagen AG, Wolfsburg (DE)

( * ) Notice: Subject to any disclaimer, the term of this patent is extended or adjusted under 35 U.S.C. 154(b) by 602 days.

(21) Appl. No.: 12/297,818

(22) PCT Filed: Apr. 2, 2007

(86) PCT No.: PCT/EP2007/002924
§ 371 (c)(1),
(2), (4) Date: May 21, 2009

(87) PCT Pub. No.: WO2007/121831
PCT Pub. Date: Nov. 1, 2007

(65) Prior Publication Data
US 2009/0228158 A1  Sep. 10, 2009

(30) Foreign Application Priority Data
Apr. 21, 2006  (DE) .......................... 10 2006 018 672

(51) Int. Cl.
*G06F 7/00* (2006.01)
(52) U.S. Cl. ...................................................... 701/36
(58) Field of Classification Search ................. 701/1, 36
See application file for complete search history.

(56) References Cited

U.S. PATENT DOCUMENTS

| 6,256,558 | B1 * | 7/2001 | Sugiura et al. | 701/1 |
| 6,459,961 | B1 * | 10/2002 | Obradovich et al. | 701/1 |
| 2003/0004616 | A1 * | 1/2003 | Obradovich et al. | 701/1 |
| 2003/0023352 | A1 | 1/2003 | Ogino et al. | |
| 2003/0216842 | A1 * | 11/2003 | Hafner et al. | 701/1 |
| 2004/0034455 | A1 * | 2/2004 | Simonds et al. | 701/1 |
| 2004/0095366 | A1 | 5/2004 | Kawai et al. | |
| 2006/0259210 | A1 * | 11/2006 | Tanaka et al. | 701/1 |

FOREIGN PATENT DOCUMENTS

| DE | 199 41 945 | 3/2001 |
| DE | 10 2005 011 094 | 11/2005 |
| WO | WO 2007/002924 | 1/2007 |

* cited by examiner

*Primary Examiner* — Paul N Dickson
*Assistant Examiner* — Robert A Coker
(74) *Attorney, Agent, or Firm* — Kenyon & Kenyon LLP

(57) ABSTRACT

The multi-function control device for a motor vehicle has a plurality of operating elements, function groups and/or functions subordinate to the function groups being operable via the operating elements, the function groups having one or more menu levels, which are displayable via a display device, and one or more function groups being active, and a selected function group from among the group of the active function groups, and/or at least one function subordinate to the selected function group is displayable using the display device, it being possible to access non-selected, active function groups and/or at least one function subordinate to the non-selected function group, within the selected function group without leaving the context of the selected function group.

10 Claims, 4 Drawing Sheets

MULTI-FUNCTION CONTROL DEVICE AND RADIO-NAVIGATION SYSTEM FOR A MOTOR VEHICLE

FIELD OF THE INVENTION

The present invention relates to a multi-function control device for a motor vehicle, having a plurality of operating elements, in which function groups and/or functions subordinate to the function groups are operable via the operating elements, the function groups having one or a plurality of menu levels, which are displayable via a display device, one or a plurality of function groups being active, and at least one selected function group from among the group of the active function groups and/or at least one function subordinate to the selected function group are/is displayable with the aid of a display device, and to a radio-navigation system for a motor vehicle having a multi-function control device.

BACKGROUND INFORMATION

A multi-function control device for a motor vehicle, in particular for the purpose of operating function groups such as navigation or radio, and for informing the driver during the ride is described in German Published Patent Application No. 10 2005 011 094, for example. This multi-function control device includes an operating unit as well as a display unit to display the desired information, and several functions can be displayed on the display unit simultaneously, e.g., the engine speed, the velocity, and the map of a navigation system. In addition, the information system includes a telephone function as well as a radio and multi-media function. A plurality of basic functions can be active simultaneously, e.g., an activated radio receiver and an activated navigation system, but only one function of these two activated functions is displayed on the display unit. If the driver then wants to select a new radio station, the function group "radio" will be activated by suitable input and shown on the display unit. In other words, when accessing a new function group, the display of the active, current function group is left, and the system moves the new function group into the foreground and displays it on the display unit, while the other active function group is moved to the background and not displayed.

In addition, in certain conventional multi-function control devices, the navigation system includes radio, multimedia and telephone functions in addition to the actual navigation function, using GPS, for example. The main function is selected via function-specific operating elements; in this case, as well, a change from the navigation function to the telephone function means leaving the navigation function.

Access to all functions is likewise possible only within the active menu structure of the selected function group, and a separate, additional operating element whose function assignment cannot be changed is provided for special functions, e.g., volume control for the radio playback.

SUMMARY

Example embodiments of the present invention provide a multi-function control device and a radio-navigation system for a motor vehicle that allow simpler and broader access to currently not displayed function groups.

The multi-function control device according to example embodiments of the present invention for a motor vehicle has a plurality of operating elements, and function groups and/or functions associated with the function groups are operable via the operating elements, the function groups having one or a plurality of menu levels, which are displayable via at least one display device such as a screen. Several function groups may be active, and substantially only one selected function group from among the group of the active function groups will be or is displayed on the display device of the multi-function control device. With the aid of operating elements, it is possible to access at least one additional active function group and/or at least one function associated with the non-selected yet active function groups within the selected and displayed function group without leaving the context of the selected or displayed function group. In other words: a device is provided by which at least one additional function group running in the background, or at least one of its functions, may be accessed without leaving the display of the selected function group. This means, for example, that in a map display of the navigation system, the station of the radio running in the background is able to be changed without leaving the basic display of the map of the function group "navigation".

This may be achieved in that the access to a non-selected active function group or a function assigned to a non-selected, active function group, which may also encompass sub-functions, is realized by a pop-up display, or a pop-up menu of operable functions, of this non-selected but active function group or of operable subfunctions or parameters, such as radio station or navigation destinations, of a function assigned to a non-selected active function group, the pop-up display being implemented within the display of the selected function group.

The access to a non-selected, active function group or to a function subordinate to a non-selected, active function group may take place via a status indicator, which is assigned precisely to this function group or function. That is to say, a separate status indicator is assigned to an active function group running in the background or to a function assigned to a function group running in the background, so that the operator, via this status indictor, can activate a pop-up menu of the desired active function group running in the background, or of the function assigned to a function group running in the background, within the selected function group, so that the context of the selected function group is not left.

According to example embodiments of the present invention, in addition to the operating displays, the pop-up menu may also provide an information display of functions or parameters of the non-selected, active function group.

The display device may include a touch screen display, and in example embodiments, the status indicator of an active, non-selected function group is formed by a touch screen operating element to which a pop-up menu is assigned.

The menu levels of a function group may be arranged hierarchically, so that the operator is able to switch from one menu level to the next.

In example embodiments of the present invention, the afore-described multi-function control device is part of a radio-navigation system or infotainment system or joined thereto for the purpose of operating the radio-navigation system or infotainment system, the radio-navigation system including at least the function groups "navigation", "radio" and "media playback", and also a GPS unit for navigation. Media playback means, e.g., a CD player and/or DVD player and/or MP3 player. Furthermore, the radio-navigation system may include a function group pertaining to a telephone function group, i.e., the radio-navigation system is connected to a suitable mobile telephony network, or is connectable thereto, via a corresponding mobile radio link.

The system according to example embodiments of the present invention allows access to functions of active function groups running in the background without leaving the selected function that is running, or that is displayed, in the foreground.

Example embodiments of the present invention are explained in more detail below with reference to the appended Figures.

DETAILED DESCRIPTION

Figure 1:
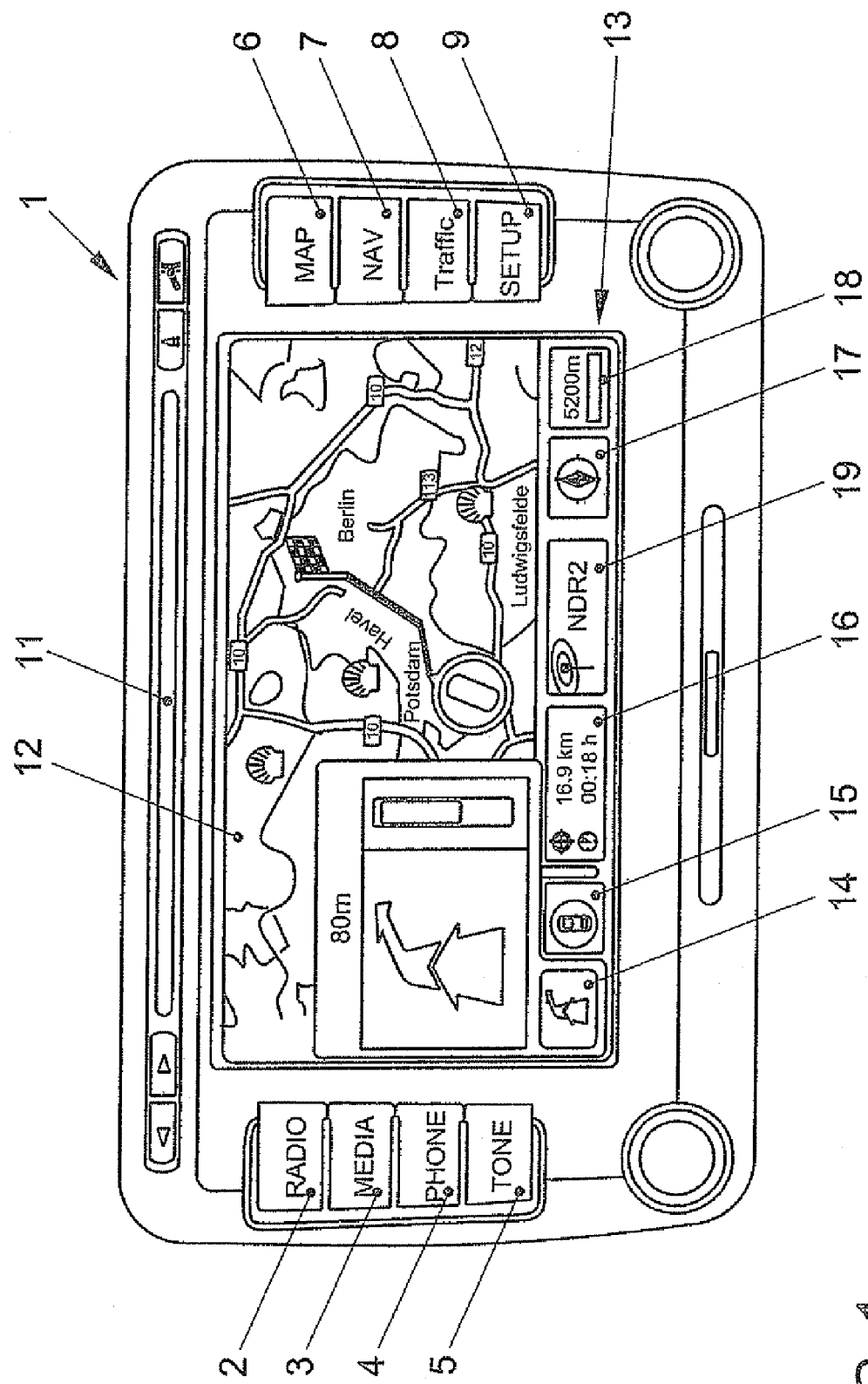
FIG. 1 is a schematic plan view of a radio-navigation system with an active navigation system.

FIG. 1 shows an infotainment system having a multi-function control device 1, which includes fixed operating elements 2 to 9 in the form of keys for operating the function groups radio 2, media 3, telephone 4, sound adjustment 5, map 6, navigation 7, traffic 8, and settings 9. These operating elements 2 to 9 are disposed to the left and right at the edge of a display device 10, which is provided in the form of a touch screen display. Above screen 10 is a slot for a CD or DVD 11 together with appropriate operating elements, which are not of interest here and thus also not discussed. Touch screen 10 shows a city map 12 with an input route from the current position to a destination, which is Berlin in this case, so that the function group "navigation" of operating element 7 is active and selected. In order to provide access to at least a few of the functions of the active function group "navigation" running in the foreground, touch screen operating elements 14 to 17 are superposed at the bottom of displayed map 12, via which the operator is able to call up functions of the function group "navigation", possibly also via pop-up menus such as, for example, the course directly ahead of the currently driven route, using touch screen operating key 14. In addition, an operating element 19 is provided within tool bar 13 of the touch screen operating elements, with whose aid access is possible to functions of the function group "radio" running in the background without leaving the context of the function group "navigation", which will be explained in greater detail in FIGS. 2 through 4.

Figure 2:
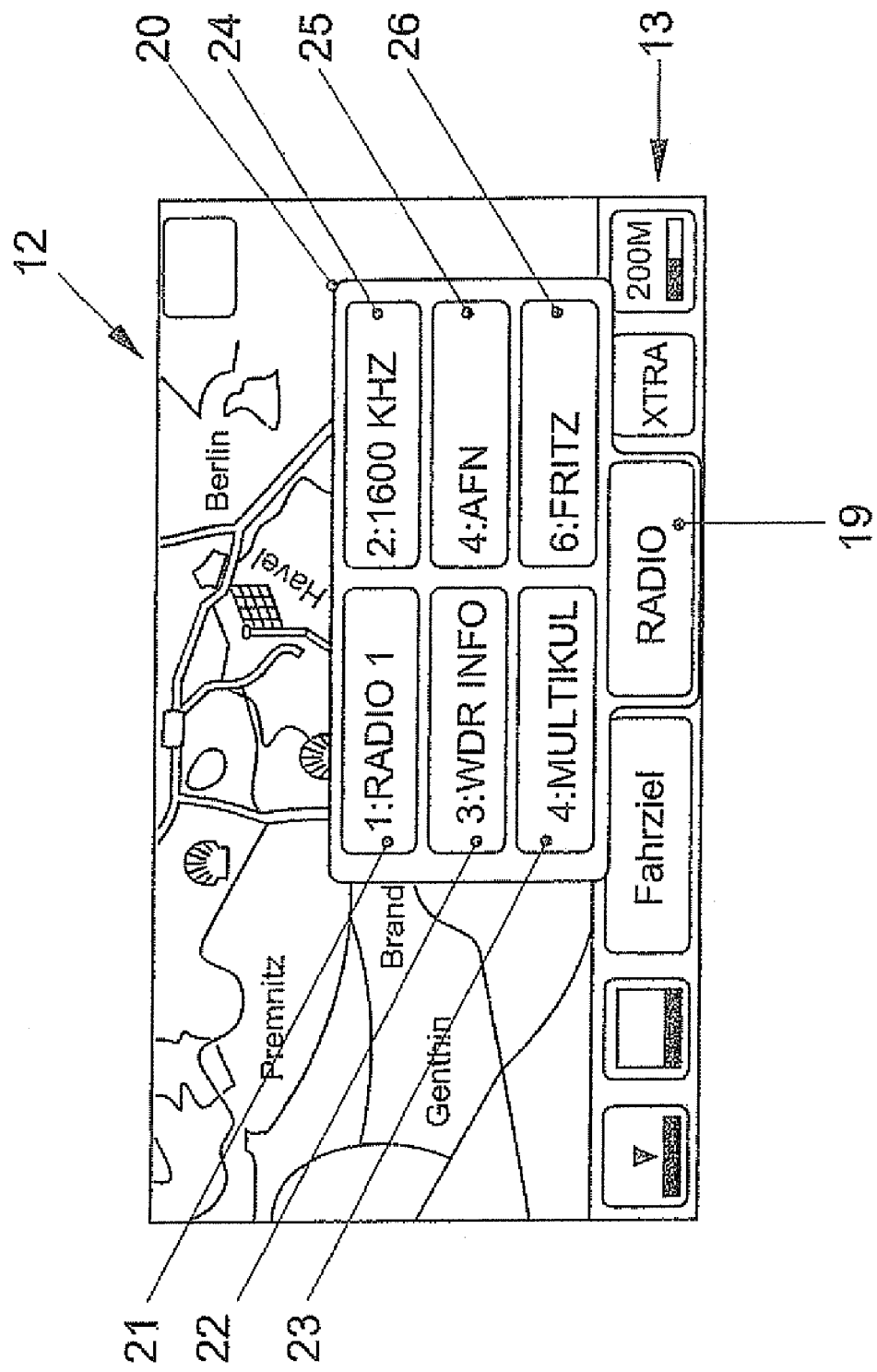
FIG. 2 illustrates the superimposition of the function group "radio"

FIG. 2 shows map 12 displayed on the screen together with touch screen tool bar 13 and also, in emphasized fashion, touch screen operating element 19 for operating a radio function running in the background. An operation of touch screen operating element 19 results in a pop-up display 20 of the functions of the function group "radio" accessible via the operating element, which is done by the display of six additional touch screen operating elements 21 to 26 in the case at hand, which indicate the currently available stations to be selected. An operation of one of the touch screen operating elements 21 through 26 results in a selection of the desired station.

Figure 3:
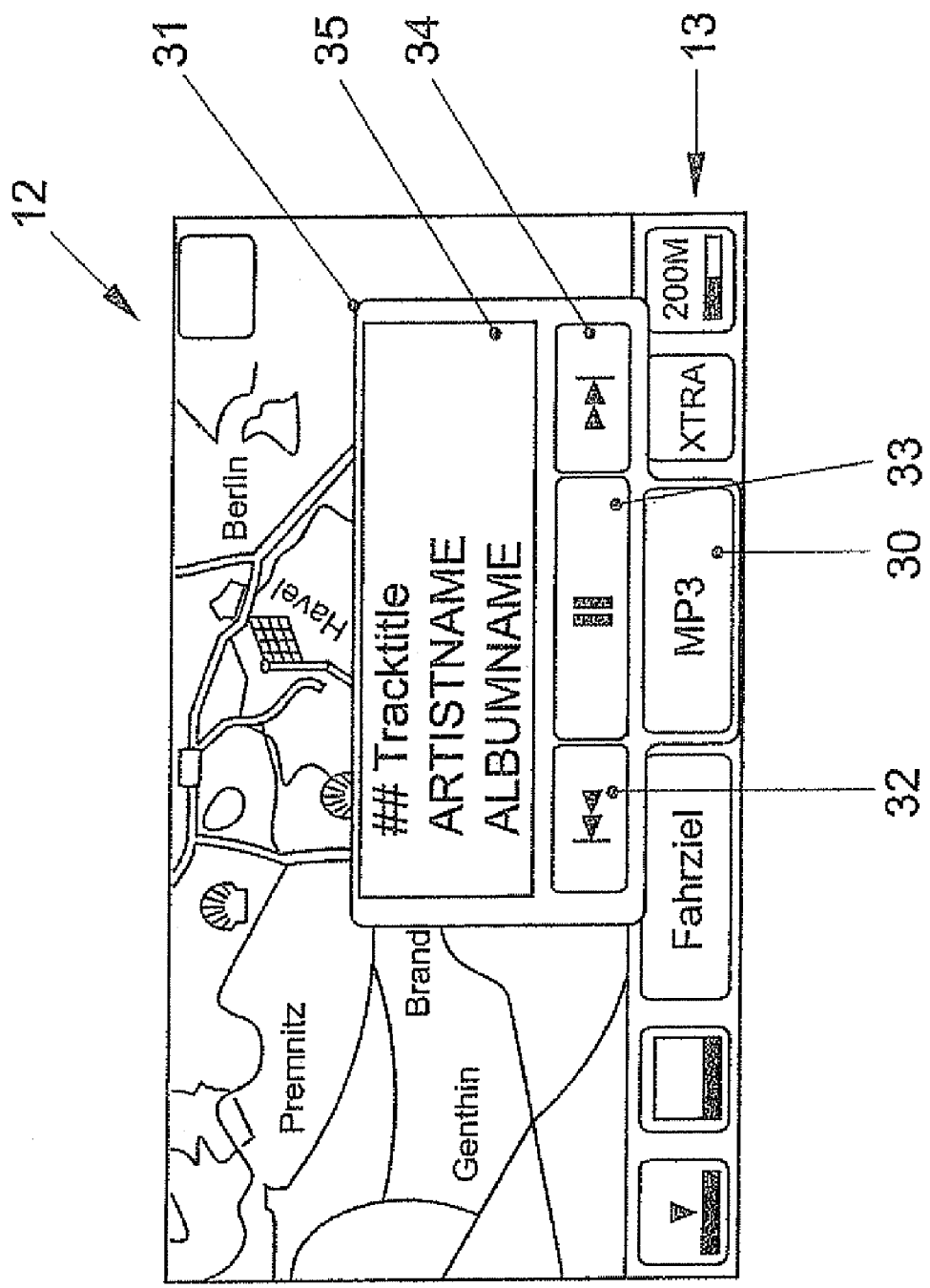
FIG. 3 illustrates the superimposition of the function group "CD-MP3-player"

FIG. 3 shows a scenario in which access to the MP3 player, which is active in the background, is possible, in addition to the function group "navigation" running in the foreground, so that a touch screen key 30 is disposed in operating tool bar 13, by which, via pop-up menu 31, functions of the MP3 player represented by touch screen operating elements 32, 33 is possible. Furthermore, a display 35 on which information about the current music piece is superposable, is part of the pop-up menu 31 of the function group "MP3".

Figure 4:
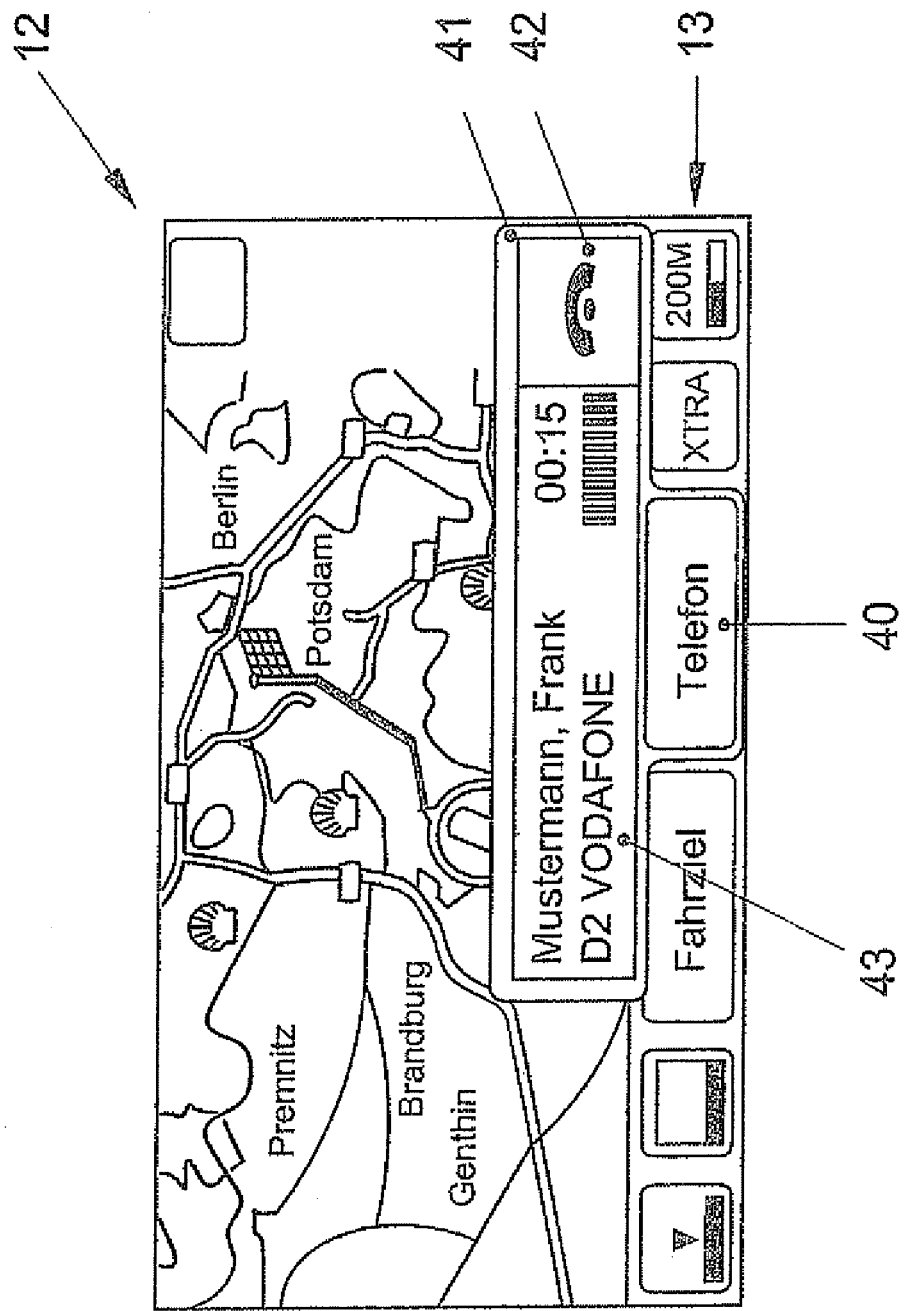
FIG. 4 illustrates the superimposition of telephone call data within the navigation context.

FIG. 4 shows the scenario where the function group "telephone" is active in the background, which is indicated by the operating element "telephone" 40 in tool bar 13. When the user operates operating element 40, a pop-up menu 41 will be superposed, onto which an additional operating element 42 for terminating a current telephone call, as well as an information window 43 are superposed, which displays the current call participant as well as the call duration, the used and possibly additional information. If no telephone call is active, then it is possible to provide operating element 42 for setting up calls, and a list of stored telephone numbers is displayed in information window 43, from which individual calling numbers may be chosen via list selection.

LIST OF REFERENCE NUMERALS 1 radio-navigation system
2 radio
3 media
4 phone
5 sound
6 map
7 navigation
8 traffic
9 setup
10 display device
11 CD/DVD slot
12 map
13 tool bar
14-18 touch screen operating elements
19 touch screen operating element of an active function group in the background
20 pop-up menu
21-26 operating elements
30 operating element MP3
31 pop-up menu
32-34 operating elements
35 information window
40 operating element
41 pop-up menu
42 operating element
43 information window

What is claimed is:

1. A multi-function control device for a motor vehicle, comprising:
a plurality of operating elements adapted to operate at least one of (a) function groups and (b) functions subordinate to the function groups, the function groups including at least one menu level; and
a display device adapted to display at least one of (a) a selected function group from among a group of active function groups, and (b) at least one function subordinate to the selected function group from among the group of active function groups;
wherein the operating elements are adapted to access at least one of (a) non-selected, active function groups and (b) at least one function subordinate to the non-selected function group within a selected function group without leaving a context of the selected function group.

2. The multi-function control device according to claim 1, wherein access to at least one of (a) a non-selected active function group and (b) a function subordinate to the function group activates a pop-up menu including operable at least one of (a) functions and (b) parameters of at least one of (a) the non-selected active function group and (b) the function subordinate to the function group, within the display of the selected function group.

3. The multi-function control device according to claim 2, wherein the pop-up menu displays information of at least one of (a) the non-selected active function group and (b) at least one function subordinate to the non-selected active function.

4. The multi-function control device according to claim 1, wherein access to at least one of (a) a non-selected active function group and (b) a function subordinate to the function group takes place via a status indicator assigned to the at least one of (a) the non-selected active function group and (b) the function subordinate to the function group.

5. The multi-function control device according to claim 1, wherein the multi-function control device is formed of a touch screen display.

6. The multi-function control device according to claim 5, wherein a status indicator is formed by a touch screen operating element.

7. The multi-function control device according to claim 1, wherein the menu levels of a function group are ordered hierarchically.

8. A radio-navigation system, comprising:
a multi-function control device including:
    a plurality of operating elements adapted to operate at least one of (a) function groups and (b) functions subordinate to the function groups, the function groups including at least one menu level; and
    a display device adapted to display at least one of (a) a selected function group from among a group of active function groups, and (b) at least one function subordinate to the selected function group from among the group of active function groups;
wherein the operating elements are adapted to access at least one of (a) non-selected, active function groups and (b) at least one function subordinate to the non-selected function group within a selected function group without leaving a context of the selected function group; and
wherein the group of active function groups comprises navigation, radio, and media-playback function groups.

9. The radio-navigation system according to claim 8, wherein the media playback function group is implemented by at least one of (a) CD-player, (b) a DVD-player, and (c) an MP3 player.

10. The radio-navigation system according to claim 8, wherein the radio-navigation system includes a telephone function group.

* * * * *